United States Patent [19]

Fisher et al.

[11] 4,438,995

[45] Mar. 27, 1984

[54] HOUSING WITH FRANGIBLE LOCKING ELEMENTS

[75] Inventors: Richard W. Fisher, Rahway, N.J.; Frank A. Cristell, 205 E. Inman Ave., Rahway, N.J. 07065

[73] Assignee: Frank A. Cristell, Colonia, N.J.

[21] Appl. No.: 287,426

[22] Filed: Jul. 27, 1981

[51] Int. Cl.³ .......................................... H01R 13/52
[52] U.S. Cl. .......................................... 339/39; 339/81
[58] Field of Search ................ 339/36, 37, 39, 75–82, 339/91 R

[56] References Cited

U.S. PATENT DOCUMENTS

| | | | |
|---|---|---|---|
| 2,462,756 | 2/1949 | Leopold | 339/36 |
| 2,464,893 | 3/1949 | Ross | 339/76 |
| 2,814,787 | 11/1957 | Jessup | 339/36 |
| 3,013,105 | 12/1961 | Craig | 339/36 |
| 3,112,148 | 11/1963 | Wochner | 339/208 |
| 3,344,393 | 9/1967 | Hendee | 339/75 P |
| 3,543,218 | 11/1970 | Archer | 339/75 P |
| 3,560,632 | 2/1971 | Wallace | 339/36 |
| 3,740,694 | 6/1973 | Fischer | 339/36 |
| 4,219,693 | 8/1980 | French | 339/39 |

FOREIGN PATENT DOCUMENTS

| | | | |
|---|---|---|---|
| 2360189 | 3/1978 | France | 339/36 |
| 1567175 | 5/1980 | United Kingdom | 339/39 |

Primary Examiner—Joseph H. McGlynn
Attorney, Agent, or Firm—Weinstein & Sutton

[57] ABSTRACT

A housing with frangible locking elements includes at least one body portion having a cavity for containing an electrical, hydraulic or pneumatic fittig therein. The housing is provided with at least one tongue-like element engageable, in locking fashion, with at least one seating area provided by another housing, a plate or a supporting structure. Once the hook-like end of the tongue is engaged on the seating area, the housing may only be removed from service by destruction of the frangible tongue-like element, indicating visually that unauthorized tampering has taken place. One embodiment of the invention includes housings having living hinges, lockable to form the fitting containing cavity, by utilizing another hook-like shaped tongue element, engageable on a seating area on an opposed marginal edge of the housing. Another embodiment includes the ability to dispose the housing, in selected spaced-apart distance relationship from a mating housing, plate or supporting structure.

10 Claims, 23 Drawing Figures

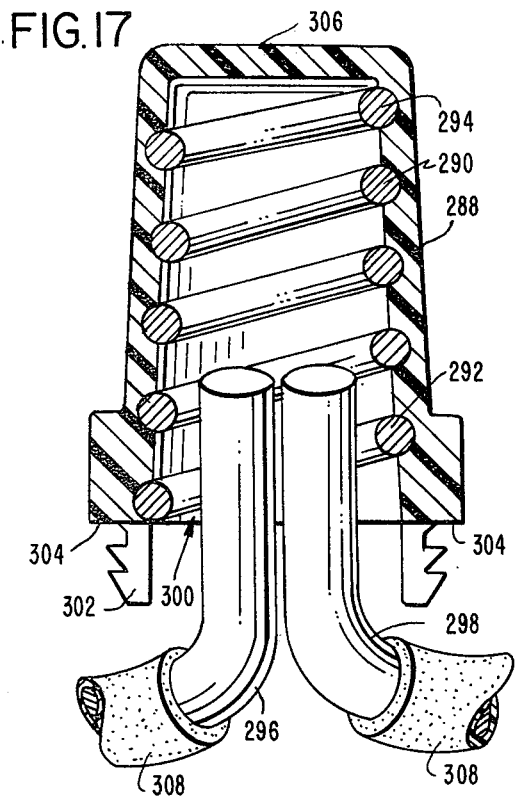
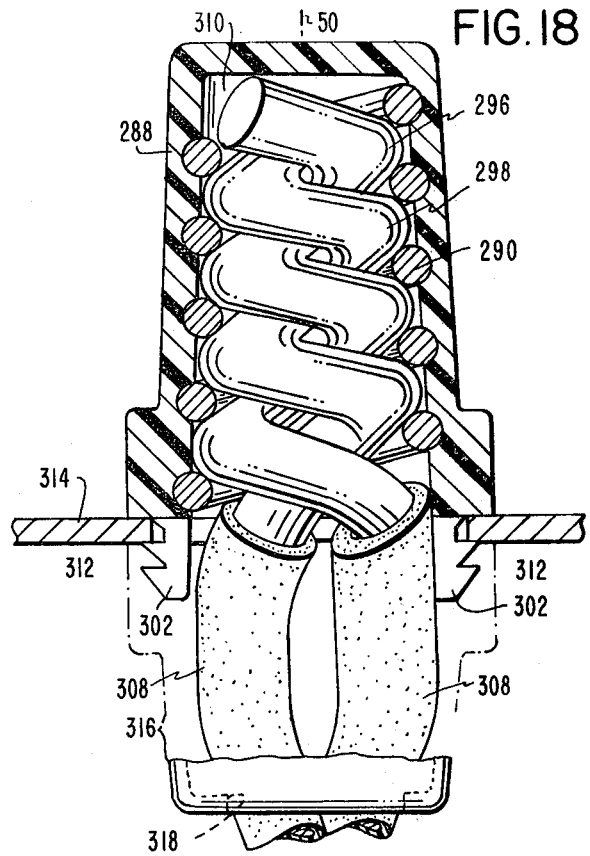
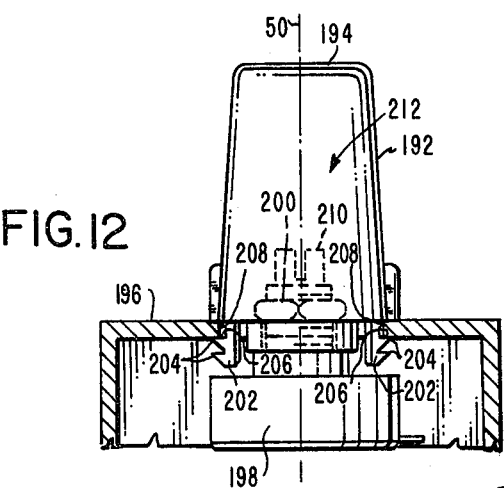
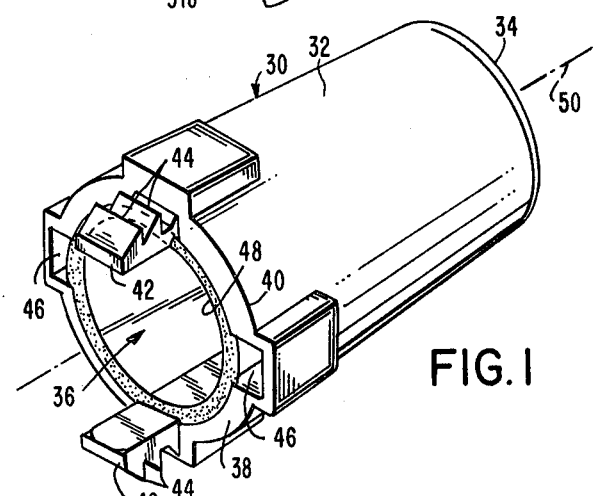
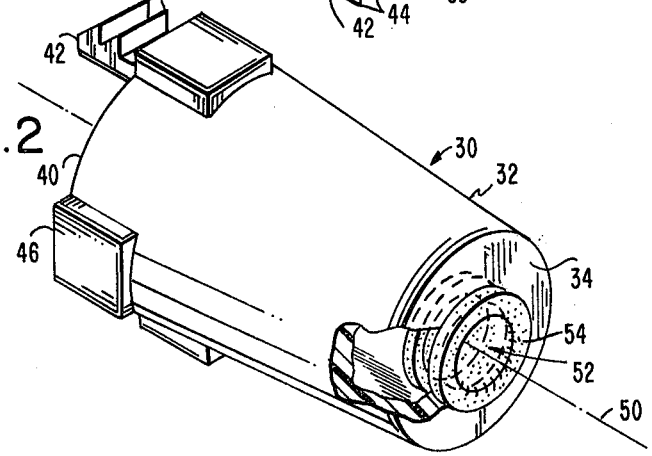

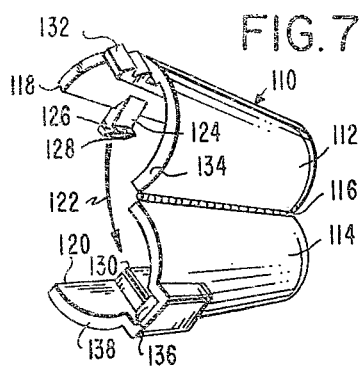
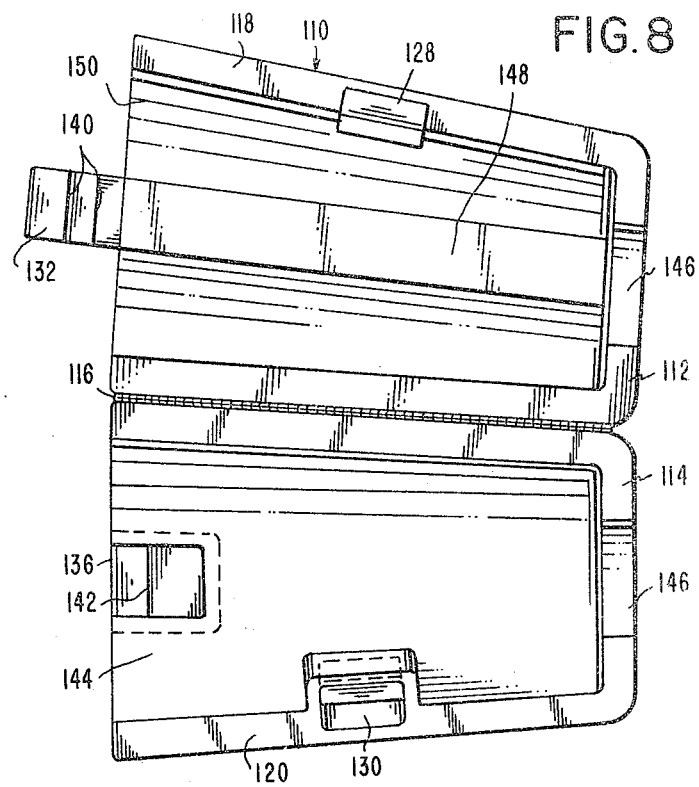
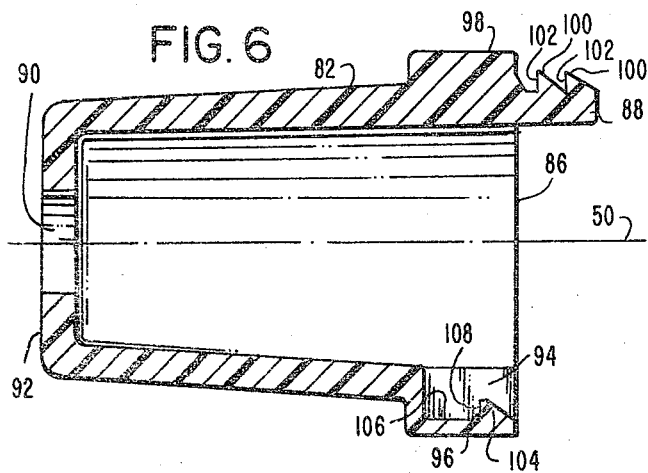
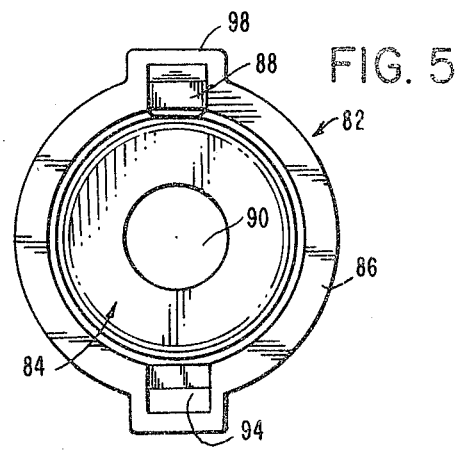
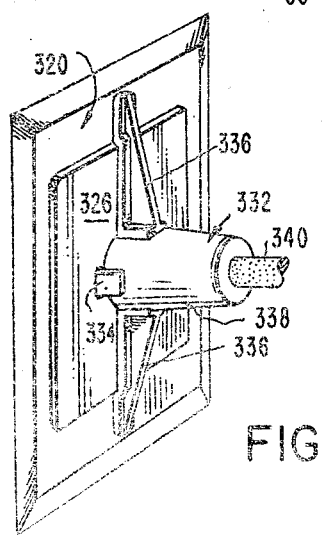
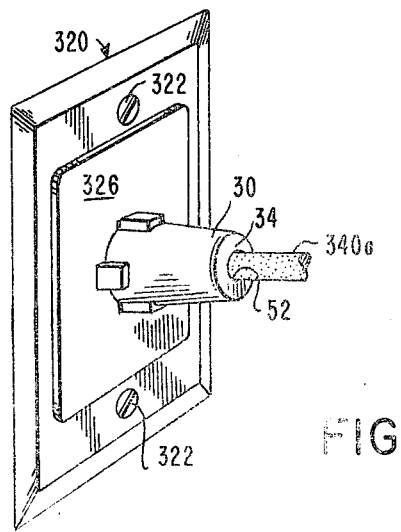

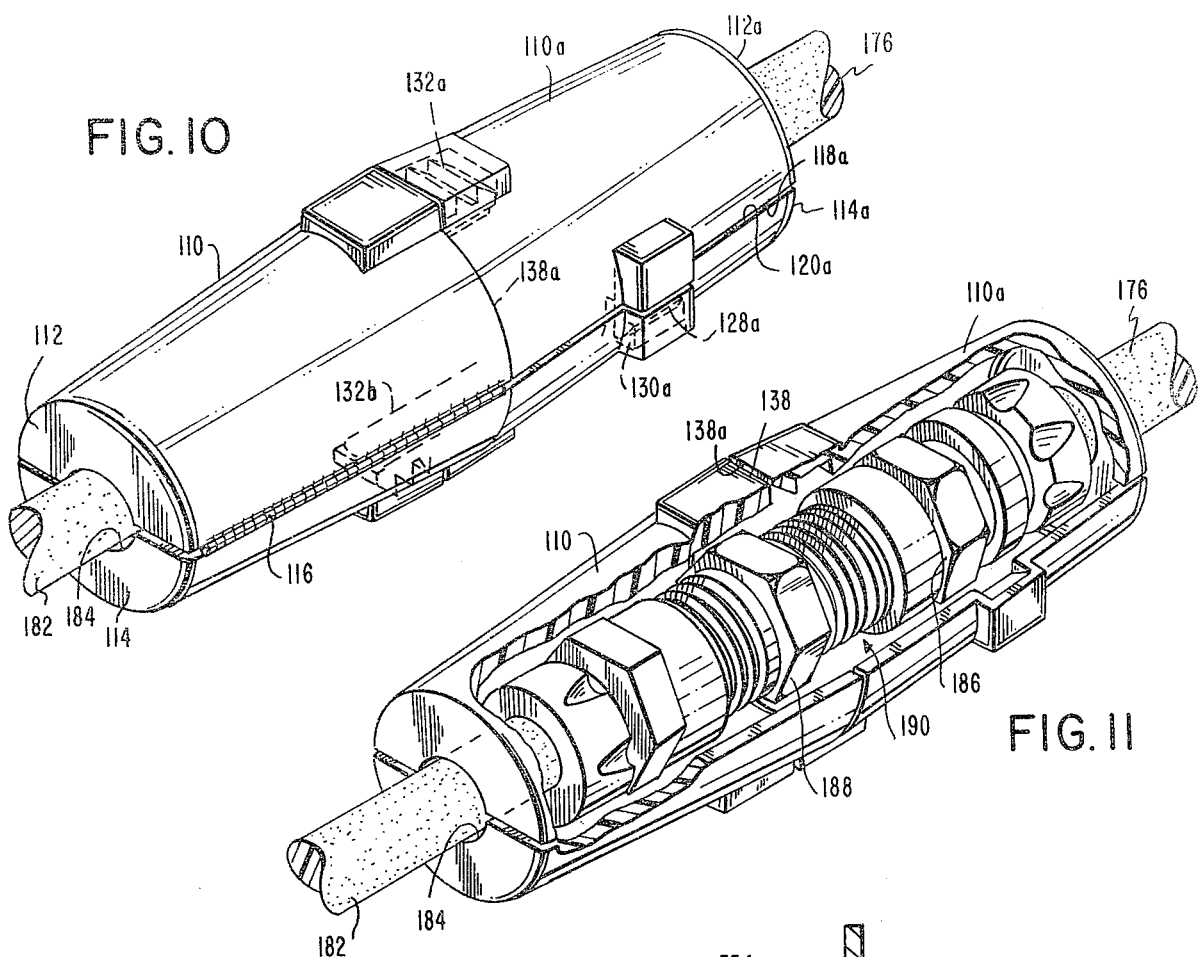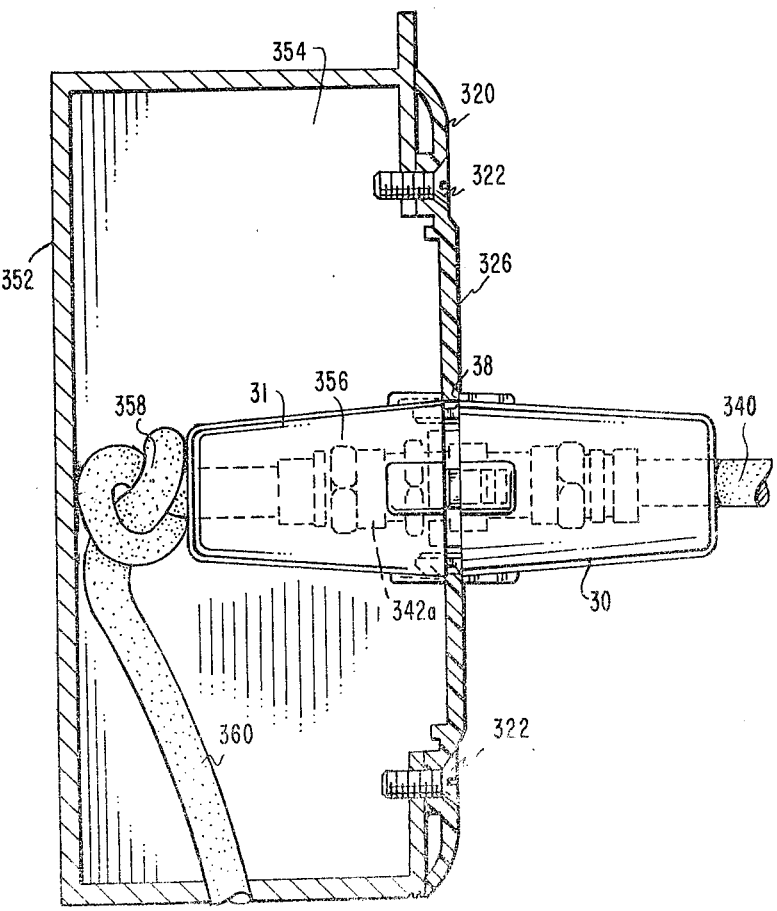

HOUSING WITH FRANGIBLE LOCKING ELEMENTS

BACKGROUND OF THE INVENTION

THE FIELD OF THE INVENTION

This invention relates generally to housings or the like, and more particularly to a housing, once closed, that can only be opened by destroying a portion thereof, and housings, once engaged to one another, plates or other supporting surfaces, must be partially or totally destroyed, providing thereby indications of unauthorized tampering of fittings of the electrical, hydraulic or pneumatic variety adapted to be contained within.

SUMMARY OF THE INVENTION

A primary object of the present invention is to provide a pilfer-resistent housing which encloses electrical, pneumatic or hydraulic fittings therein, limiting the ability of unauthorized personnel from gaining access to the fittings or the ends of lines or cables coupled thereto.

Another object of the present invention is to provide a housing, which when attached to another housing, of similar construction, or to a plate, supporting surface, or sheet, cannot be removed from its enclosing use, unless portions of the housing have been irrevocably destroyed, providing thereby an indication that unauthorized tampering has taken place.

Still another object of the present invention is to provide housings that must be installed on an apparatus prior to the connection of fittings, be they pneumatic, hydraulic or electric, to associated lines or cables.

Yet another object of the present invention is to provide a housing apparatus which can be attached to a portion of a cable or line, having a fitting coupled thereto, without requiring that such fitting be decoupled in order to accommodate the attachment of such housing.

Yet another object of the present invention is to provide a housing construction which is suitable for attachment to a similarly constructed housing, or to a plate or supporting surface installed thereinbetween, all the while insuring that the single housing or the double housing installation, utilizing such plate or supporting surface totally engages and surrounds fittings secured within the cavities of the housing.

Still another object of the present invention is to provide an inexpensive housing apparatus, of unitary construction, bearing authorized indicia thereon, which cannot be easily duplicated in an effort to conceal prior unauthorized tampering.

Still another object of the present invention is to provide security housings of various colors, each color indicating a specific use or application, so as to serve the purpose of ready, long-distance observation of authorized personnel of the use or application of lines and fittings in a complex of lines and fittings.

Still another object of the present invention is to provide a housing assembly that resists tampering and indicates the presence of prior tampering, that may be installed to existing installations of lines, pipes, and conduits, and covering portions of fittings, which may be installed without the need for special tools and equipment.

Yet another object of the present invention is to provide a housing which may be secured to supporting surfaces so as to provide visual access to an apparatus mounted on such supporting surfaces whilst prohibiting manipulation of such apparatus by unauthorized personnel.

Yet another object of the present invention is to provide a housing assembly which, encases fittings therewithin, in a waterproof fashion.

BRIEF DESCRIPTION OF THE DRAWINGS

FIG. 1 is a perspective view of an embodiment of the present invention.

FIG. 2 is another perspective view of the embodiment of the present invention depicted in FIG. 1.

FIG. 5 is a side-elevation view of another embodiment of the present invention.

FIG. 6 is a cross-sectional view of the embodiment of the present invention shown in FIG. 5.

FIG. 7 is a perspective view of still another embodiment of the present invention.

FIG. 8 is a side-elevation view of the embodiment of the present invention shown in FIG. 7.

FIG. 9 is yet another embodiment of the present invention.

FIG. 10 is a perspective view of the embodiment of the present invention shown in FIG. 8.

FIG. 11 is a partial cut-away perspective view of the embodiment of the present invention shown in FIG. 10.

FIG. 12 is a side-elevation view of a modified form of the embodiment shown in FIG. 1, shown secured to a mounting surface.

FIG. 17 is a cross-sectional view of still yet another embodiment of the present invention.

FIG. 18 is a cross-sectional view of the embodiment shown in FIG. 17, showing electrical conductors disposed therewithin.

FIG. 20 is an alternate embodiment of the apparatus shown in FIG. 21.

FIG. 21 is a perspective view of the cover plate shown in FIG. 19, showing the apparatus depicted in FIG. 3 secured thereto.

FIG. 23 is a side-elevation cross-sectional view of the embodiment depicted in FIG. 3, secured to a cover plate, as shown in FIG. 19.

DESCRIPTION OF THE PREFERRED EMBODIMENT

Figure 19:
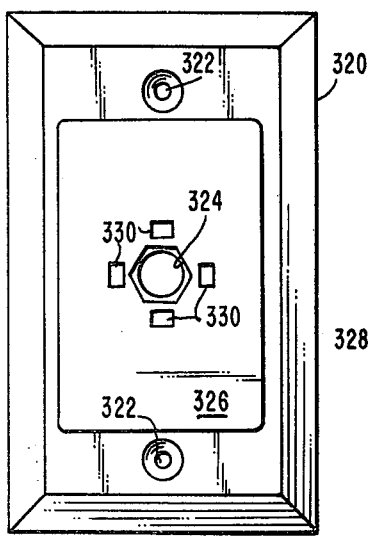
FIG. 19 is a cover plate for an electrical junction box, shown in front elevation.

It will be appreciated that electrical service lines, such as those carrying television receiver signals, on a commercial basis, into residences, are subject to unauthorized tampering. The tamperer is inclined to obtain access to fittings, such as connectors and plugs, inserting into the circuit unauthorized fittings so as to electrically connect additional television receivers to a single line rented commercially to the residents. The resultant tampering not only reduces revenues to the service organization providing the cable carrying television signals, but greatly increases the possibility of causing electrical disturbances or inoperativeness of an entire network of residences, each of which are coupled to a common service main. In addition, it is highly desirable to provide a housing-like covering, which covering may be removed by authorized personnel, and easily replaced, after such removal, as well as easily installed during the original installation of the equipment. Fittings that pass through outlet boxes, similar to household utility boxes, as well as fittings terminating at the ends of flexible cables, can all be protected by devices that inhibit tampering and exhibit the efforts of tampering, upon later inspection by authorized personnel. Additionally, identification of various cables, in a network of electrical cables employed in the cable television industry, can be accomplished by such a clampable form of housing, which can be removed only by destructive forces being applied to the housing. Amongst the important considerations is the ease in which the housing can be attached to the cable or fitting which is intended to be covered. Another consideration is that the housing hinders tampering without destruction of the housing itself.

The present invention provides a housing-like member having at least one hook-like protrusion extending outwardly from one end thereof. Such hook-like member, preferably fabricated from a plastic material, is adapted to engage within another housing, a plate, or other supporting surface, which is provided with a seating surface. When the hook-like member engages the seating surface, the housing element is prevented from disengagement therefrom and may not be removed unless at least the hook-like member is broken away from the housing. Naturally, the housing itself may be destroyed, thereby exposing the portions of the cable or the fitting confined within a cavity in the housing. Other applications include lockable housings, removable only by the application of destruction forces, to cover operating handles, shafts, pushbuttons, or other devices—otherwise unaccessible unless the housing is removed.

The present invention also provides a sealing device, which may be attached to the housing, so as to waterproof an opening through which a cable, line or pipe passes, as well as waterproofing the face of the housing, which is intended to seat upon a mating housing, a supporting plate, or other supporting surface.

In another embodiment of the present invention, the housing parts may be provided having a living hinge, closable so as to form a symmetrically-shaped housing, utilizing still another hook-like member engageable with a mating seating area. The use of such embodiment eliminates the need to connect fittings to the service line, such as an electrical conductor, only after the line passes through a line opening in the housing.

Another embodiment of the present invention provides a plurality of either spaced-apart hook-like members, extending outwardly from the housing, or a plurality of spaced-apart seating areas, adapted to receive the hook-like member, and extending parallel to direction of insertion of the hook-like member into engagement with the seating areas. In this manner, a housing may be positioned selected distances apart from its mating housing, plate or supporting surface, thereby accommodating for various fitting lengths and permitting the same housings to be utilized with or without supporting plates thereinbetween. In other embodiments the housing may be provided having two hook-like members, as well as two seating surfaces, so as to permit identical housings to join one another, and to form thereby a combined housing-like structure, having twice the cavity length of each individual housing elements.

The housing members are preferably fabricated from a plastic material, such as polypropylene, so as to permit the tongue-like elements, each bearing at least one hook-like end, from being broken away when it is desired to remove the device, by an authorized individual. The housing members can be fabricated in a plurality of colors (each indicating the type of authorized service, dates, or other coded information, valuable to authorized use).

The housing, preferably having a cavity sufficient to contain the fitting therein, is provided having an opening, through which the line servicing the fitting passes. For housings which are destined to prevent tampering of stationary electrical, pneumatic, or hydraulic elements, employ housings that simply have a flat surface adjacent its open mouth portion. The balance of the housing defines walls and an end base devoid of other openings. In such applications, the housing may be fabricated from a transparent plastic material, such as acrylic.

A housing element, suitable for enclosing a male plug-like electrical fitting, common in the cable television industry, is preferably fabricated having a truncated conical shape, with an opening appearing at opposed ends of the cone. The major opening is provided having one or more hook-like ends. The interior surface, adjacent the major opening, carries a seating surface or area which substantially resides in a plane extending normal to the longitudinal axis of the housing. The plane of such seating surface is spaced apart from the marginal edges defining the major opening, a distance equal to the length separating such marginal edges from the free end of the hook-like member. Two similar housing assemblies, after being threaded about the line carrying each fitting, are locked together by permitting the tongues carried by each housing to engage opposing seating surfaces. The resultant structure resembles two truncated conical shapes, each having their major openings in juxtaposed relationship, and a cable emanating out of each of the smaller ends of the assembly. Engaged within the cavity formed by both housings are the two fittings which are locked together mechanically and engaged in electrical contact with one another—in the case of an electrical fitting.

In the event it is desired to make such installation waterproof, precluding water from engaging the electrical type fittings above described, a pair of rubber-like bushings are utilized, one each in the line carrying openings of the assembly. An O-ring is installed intermediate the two marginal edges located adjacent the major openings, so as to seal together such marginal edges against the intrusion of water into the cavity.

Another embodiment of the present invention is to utilize two hook-like tongues and two seating surfaces carried by a pair of identically-shaped housing elements, which may be locked together.

Cover plates, similar to the type found on household utility outlet boxes, are oftentimes employed to support socket-like connectors, connected to cable lines carrying cable television signals. A plug, having an electrical cable connected thereto, is attached to the external portions of the female socket, exposed in the living quarters of the residence. In such applications, the plate itself is provided with at least two openings, permitting the frangible hook-like tongues to pass therethrough. The rearmost surface of the cover plate may act as a seating surface for the hook-like ends of the tongue, fitted onto the housing element, thereby precluding a user from attaching any but an authorized plug and cable to the socket. In the event it is desired to protect the socket assembly as well from unauthorized tampering, the concealed portions of the socket made available by removing the cover plate from the utility box, another housing element may be fitted over the interior portions of the socket, installed to extend inwardly from the unexposed surface of the cover plate. Two housing elements, each disposed on opposite sides of the cover plate, can be locked together, sandwiching thereinbetween the cover plate and fully enclosing the socket as well as the plug assemblies.

To permit two housing elements, described above, for engagement with one another, in the case that a cover plate is interposed thereinbetween as well as in the case where no cover plate is required, as in a cable-fitting installation, each of the tongue-like elements are provided having two hook-like ends, one closer to and one further from the major opening of the housing, and two seating surfaces, each located different distances from the plane defining the major opening of the housing element. In this fashion, two housing elements may be engaged to one another, so as to permit their marginal edges adjacent the major openings thereof to be spaced apart a fixed distance, upon a modest initial application of clamping forces, or to touch one another, upon a successive force, seating together the opposite juxtaposed marginal edges.

A housing element may be fabricated, in yet another embodiment, of two similarly shaped surfaces, each representing half of the truncated conical shape above described. Such half-housing is of a shape that would be obtained by cutting the truncated conical housing structure, above described, along a plane passing through the longitudinal axis of the truncated housing. Each half-housing element is joined together at one marginal edge extending between the major opening and the smaller diameter end. Such joining can be, if desired, by a living hinge. Alternatively, such joining can be obtained by yet another tongue carrying a hook-like end, which is adapted to be engaged within a seating surface disposed in the interior wall of the mating half-housing element, such additional hook carrying tongue extending transverse to the longitudinal axis of the marginal edge defined by such plane. The other marginal edge extending between the major opening and the smaller diameter end of the housing elements may be joined together by yet another locking arrangement of hook-like ends of a tongue-like device and a seating surface carried in the opposed interior wall of the mating half-housing element. In the event that such housing is designed to be fastened to another similar housing, or plate, or other supporting surface, additional tongue-like elements and seating surfaces, operating in the direction of the longitudinal axis of the closed two half-housing element assemblies, may be employed. In cable to cable installations for electrical, pneumatic and hydraulic fittings, a perfectly cylindrical half-housing element can be employed, either utilizing a living hinge and a locking tongue and seating surface arrangement, or, if desired, two tongue and seating surface arrangements. An opening for passage of lines or cables may be disposed at each end of such cylindrical housings.

It is obvious that combinations of features can be employed in any one construction, so as to facilitate any specific application or usage. Common to all of such usages however, is at least the utilization of a frangible housing, locatable to itself or another housing, a plate, or some supporting surface, each carrying at least one seating surface for locking engagement of a tongue-like element attached to the housing. Such housings may only be removed by partial or total destruction, signifying that tampering has taken place. Such usage may also include however, a household utility plate or cover, fitted to duplex outlet receptacles, the plate carrying at least two additional small openings therein. The housing employed in this case is equipped with an interior cavity, substantially having a length equal to the free length of any plug employed therein, when the blade-like contacts of the plug are inserted into one of the duplex outlets. Thus, after the plug is inserted into its energy providing outlet, the housing is secured to the cover plate, utilizing the hook bearing tongues therefor. The plug may not be removed except by destruction of the housing or its frangible tongues, thereby insuring that the electrical device, coupled to the plug and associated electrical cable, shall at all times thereafter be provided with electrical energy—as is the requisite for time clocks, clocks, exit signs, and the like.

More particularly, and as will be described in more detail hereinafter, with reference to the drawings, each housing assembly is provided with at least one tongue carrying a hook-like end and one associated co-acting seating surface or area. The hook-like ends of the tongue are adapted for one-time locking engagement with a seating surface or area. The clamping surface of the tongue is disposed contacting the seating surface, resisting thereby disengagement of the hook-like end of the tongue and the mating seating surface, except by breaking of the housing or the tongue elements. In some embodiments, the present invention utilizes at least two tongues having hook-like ends and matable co-acting seating surfaces, each extending parallel or in normal relationship with the plane defining the major opening of the housing. It will become obvious that the plane of the surface defining the clamping surface of the tongue, located on the hook-like ends thereof, as well as the plane defining the seating surface or seating area, coacting therewith, can extend parallel to one another to insure a good locking arrangement. Such planes, in the embodiments described, can extend parallel to the longitudinal axis of the housing. In this case, the tongue and seating surface would be utilized to lock together portions of the housing so as to create a unitary housing out of housing halves, either of the separate variety, or of the variety depicted herein having a joining feature, such as a living hinge. When such planes characterized by the clamping surface and the seating surface extend substantially transverse to the longitudinal axis of the housing, the tongue and seating surface would be utilized for purposes of attaching the housing to another housing, to a supporting surface, to a plate, or the like. In either case, the planes defining the seating surface and the coacting clamping surface of its matable tongue must be exactly normal to the axis lines defined or pitched in such a way that the housing halves, or the housing itself, may not be removed without a destruction of the frangible parts of the apparatus.

Now referring to the embodiments illustrated in the Figures, FIG. 1 shows a housing 30, having side walls 32 and end 34 and an opening 36, disposed at another end 38, about which are marginal edges 40. A pair of tongues 42 are provided, each having outwardly extending serrations 44. Tongue receiving openings 46 are provided extending along a line, not shown, being disposed at right angles to another line, not shown, passing through tongue-like structures 42. If desired, O-ring 48 may be fitted to marginal edge 38. Dotted lines 50 pass through the geometric center of opening 36, and end 34. Side walls 32 define a truncated conical shape, if desired.

FIG. 2 illustrates the apparatus depicted in FIG. 1 and includes an opening 52 residing in end wall 34. If desired, a grommet-like element 54 is provided. Grommet 54, when employed, insures a water-tight fit to a conduit, pipe, or electrical cable, not shown, passing through opening 52. O-ring 48, when employed, insures a water-tight fit when housing 30 has surface 40 engaged with a supporting surface or when clamped to another housing 30, in locking position. Openings 46 permit the insertion of tongues 42, from an adjacent housing, such that mating surface 40 of adjacent housings, can engage one another. Protrusions 44 are adapted to engage a seating surface, not shown in FIGS. 1 and 2, so as to permit housing 30 to lock to an apparatus equipped with such seating surfaces. Normally, each of openings 46 are provided with seating surfaces which permit the engagement of protrusions 44, in locking relationship. Tongues 42 are adapted and configured to have protrusions 44 non-releasably lock onto such seating or camming surfaces, so as not to be able to be released therefrom until either housing 30 is destroyed, such as by cracking, or tongues 42 are broken away from the remaining portions of housing 30.

Figure 3:
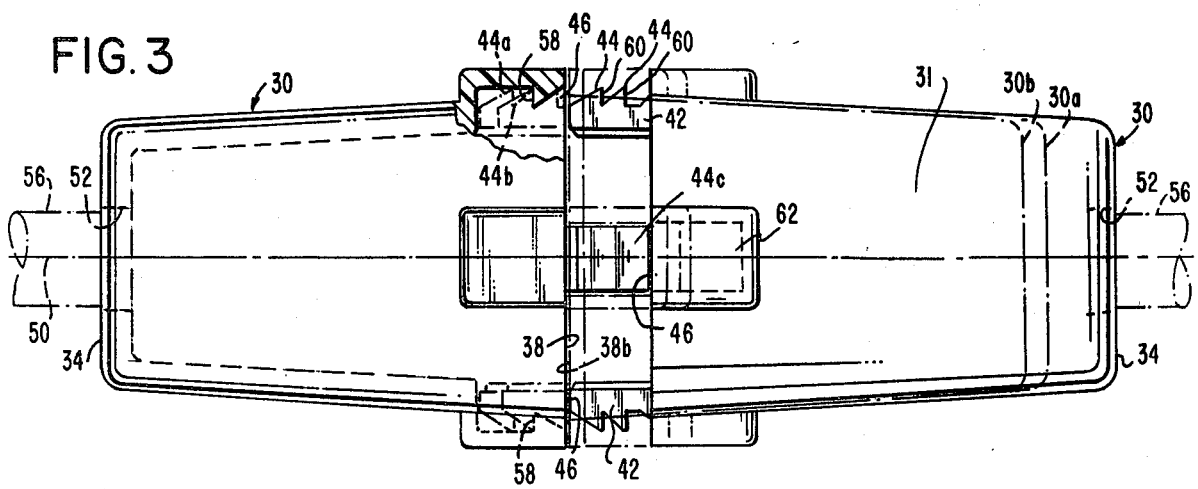
FIG. 3 is a side-elevation view of the embodiment of the present invention shown in FIG. 1.

FIG. 3 illustrates housings 30 being shown in displaced apart relationship, along axis line 50, shown in dotted lines. Dotted lines 56 depict a cable, pipe, or conduit, passing through openings 52, in end walls 34 of housings 30. As shown, rightmost housing 30 is depicted having tongues 42 shown disengaged from adjacent openings 46, in leftmost housing 30. Seating surface 58 acts as a locking surface for the flattened portions 60 of protrusions 44. Flattened surfaces 60 and protrusions 44 provide a hook-like end to tongues 42. Dotted lines 30a depict right-hand housing 30 being fored leftwards, along the direction of dotted lines 50, so as to permit an engagement of leftmost protrusion 44a with seating or locking surface 58. Dotted lines 30b illustrate the location of rightmost housing 30, when such housing is moved fully towards leftmost housing 30, in a direction along dotted lines 50. At such location, protrusion 44b is fully engaged with seating or locking surface 58, such that marginal edges 38 and marginal edges 38b, of leftmost housing 30, when disposed in the positions shown by dotted lines 30b, are in engaged touching juxtaposed relationship. Similarly, tongue-like element 44c, fitted to leftmost housing 30, is shown engaged into wall portion 62, surrounding and defining opening 46, of housing 30b, so as to permit the two tongues of leftmost housing 30 to engage seating surfaces, not shown, similar to seating surface 58, disposed within wall portions 62. The completed assembly employs four tongues 44 engaged on four seating surfaces, when surfaces 38 and 38b are disposed touching one another. Similarly, surfaces 38 and 38b can be disposed a fixed distance apart, as shown by dotted lines 30a, whilst having protrusions 44 engage camming surfaces 58. In either case, housings 30 are locked to one another and may not be removed from touching engagement, unless the housings or their associated tongues are destroyed. Indicia 31 is shown on housing 64.

Figure 4:
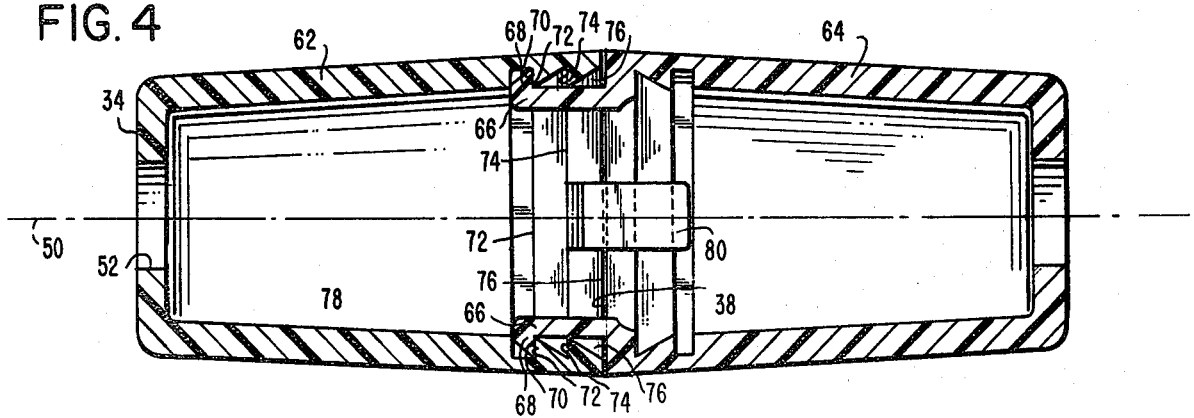
FIG. 4 is a cross-sectional view of the embodiment of the present invention shown in FIG. 3.

FIG. 4 illustrates an alternate embodiment to the apparatus shown in FIG. 3, employing housing elements 62 and 64. Housing 64 is provided with a pair of tongues 66, each having a single protrusion 68. Surfaces 70 are provided on protrusions 68 and may be engaged on seating or locking surfaces 72, 74, or it should be noted that seating surfaces 72, 74, and 76 extend annularly around the interior surface 78 of housing 62, adjacent marginal edges 38 thereof. Hole 52 is shown at end 34 of housing 62 and may be utilized to have a pipe, conduit, or cable pass therethrough. Another tongue 80 is fitted to housing 62, and is provided with a protrusion, not shown, similar to protrusion 68 for tongue 66 of housing 64. Thus, housing 62 and 64 may be disposed locked together, as shown, but such that housings 62 and 64 may be rotated relative to one another, about dotted lines 50, shown passing through the centers of housings 62 and 64. Rotation may be limited by tongue 80, or a companion tongue not shown, due to interference with tongues 66. However, housing 62 and 64 may be fabricated from an identical mold, and are identical in construction in every regard, thereby minimizing the cost of manufacture.

FIG. 5 illustrates yet another embodiment of the present invention 82, as viewed from the major opening 84 thereof. Marginal edges 86 surround the major opening 84 from which tongue 88 emanates. Hole 90 is shown passing through end wall 92 of the apparatus, shown also in FIG. 6, having a generally truncated conical shape. Opening 94 communicates with opening 84, and is surrounded by side walls 96. Adjacent tongue 88 is a reinforcement or boss portion 98. Tongue 88 is fitted with protrusions 100, each having clamping surfaces 102. Inwardly directed protrusion 104, found on the interior surface 106 of side wall portion 96, is provided having a clamping planar surface 108. Thus, when another housing 82 is disposed so as to have its tongue 88 enter into opening 94 tongue 88 of the housing 82 shown can be directed to engage the opening 94 of such other housing. Protrusions 100 would thus be caused to pass beyond protrusion 104, as the pair of housings are urged together, causing opposed symetrically shaped marginal edges 86 to come into touching engagement. When this occurs, clamping surface 102 will engage surface 108 and remain engaged therein until a destruction of one or more housings takes place or until frangible tongues 88 are broken away by an appropriate destructive force. As in the case of the apparatus depicted in FIGS. 3 and 4, housing 82 may be displaced apart from a companion housing 82, not shown, when rightmost clamping surface 102, shown in FIG. 6, engages an equivalent surface 108 of a mating housing 82, not shown, thereby permitting surfaces 86 to be separated a fixed distance apart.

FIG. 7 illustrates an alternate embodiment to the apparatus shown in FIGS. 5 and 6, comprising housing 110, which utilizes two housing halves 112 and 114. Such housing halves are joined together by living hinge 116, so as to permit the elongated marginal edges 118 and 120 of housing halves 112 and 114 respectively, to come into touching engagement when housing half 112 is moved in the direction of arrow 122. When so moved, side mounted tongue 124, equipped with protrusion 126 and its related hook-like end and clamping surface 128, is moved into opening 130, fitted on marginal edge 120. A seating or locking surface, not shown, similar to surface 108, of FIG. 6, is disposed in opening 130. Accordingly, housing halves 110 and 114 can be disposed in locking engagement by clamping same about an existing pipe, conduit, or cable, and if desired, a fitting, coupling device attached thereto. Tongue 132 is provided on marginal edge 134 of housing half 112. Opening 136 is disposed adjacent marginal edges 138 of housing half 114. Opening 136 has provided therein a clamping or locking surface 108, similar to that shown in FIG. 6, for utilization by another housing, not shown, equipped with the equivalent of tongue 132. The apparatus depicted in FIG. 7 is substantially the equivalent of the apparatus depicted in FIG. 6, save for the ability to attach same to an existing apparatus, without need to unwire or rewire same, if it is electrical in construction, or without need to decouple and recouple fitments of a pneumatic or hydraulic nature, for apparatuses employing same.

FIG. 8 is the apparatus depicted in FIG. 7, illustrating tongue 132 having two protrusions 140. Surface 142 is provided in side walls 144 of housing half 114, so as to permit locking engagement of another tongue 132 attached to another housing 110, not shown. Openings 146 comprising semi-circular grooves, form a circular opening when marginal edges 118 and 120 are disposed in touching engagement. If desired, rib 148 can extend along the interior of interior surface 150, to support tongue member 132.

FIG. 9 is an embodiment of the apparatus shown in FIGS. 7 and 8, forming housing 152. A living hinge member 154 is employed, in a similar fashion to living hinge 116, shown in FIGS. 7 and 8. Similarly, a tongue element 156 is employed for engagement within opening 158, located in lower half housing 160. Upper half housing 162 is fitted with tongue 156. End 164 and end 168 of lowermost housing half 152 are provided having semi-circular notches 166. Uppermost housing half 170 has its ends 172 and 174, similarly adapted with semi-circular openings. When housing halves 172 and 152 are engaged as shown, a circular opening is formed at both ends of the housing, symetrically about dotted lines 50. As can be seen, in the embodiment illustrated in FIG. 9, there are no tongues extending along a line that is parallel to a line passing through openings at the ends of the housing. The apparatus illustrated in FIG. 9 would simply be employed for purposes of clamping about a pre-existing plug and socket assembly, each fitted to cables, so as to prevent tampering thereof. Housing assemblies shown in FIG. 9, could not be secured to any supporting surface, plate, or other fixed structure, except by other means, well known in the art. It would, however, be prevented from motion along the length of an electrical cable, by the presence of a fitment, cable or plug, whose radial dimensions exceed the circular-like openings found at opposite ends of the housing assembly.

FIG. 10 illustrates the apparatus shown in FIGS. 7 and 8, shown coupled to a companion housing. Here, leftmost housing assembly 110 is shown secured to rightmost housing 110a. Tongue 128a, shown in dotted lines, is shown secured within opening 130a. Marginal edges 118a are in touching engagement with marginal edges 120a. If desired, such marginal edges may be adopted with a sealing material, such as rubber, so as to provide a water-tight fitment. Cable end 176 is shown emanating outwardly from end walls 112a and 114a. Cable end 182 is shown emerging outwardly from rearmost wall half 112 and 114. A grommet, not shown, similar to that depicted in FIG. 2, may be employed in the vicinity of opening 184, if desired, to waterproof cable 182. Tongue 132a, shown in dotted lines, is shown engaged within portions of housing 110a, near marginal edge 138a thereof. Dotted lines 132b define a tongue, secured to housing 110a, which engage within housing 110, so as to cause a locking together of housing 110 and 110a.

FIG. 11 illustrates an electrical socket 186, secured within housing 110a, in electrical engagement with plug-like assembly 188, secured within housing 110. It should be noted that opposed marginal edges 138a and 138 are shown in touching engagement. In use, housing 110a is assembled by having its circumferential tongue, or housing closing tongue 126, as shown in FIG. 7, engage and lock to its mating, seating or locking surface. Then, housing 110a is moved towards socket 186. After assembly of housing 110 to cable 182, in a similar fashion, both housings 110 and 110a are locked together, employing tongues 132a and 132b therefor. The resultant housing assembly has no access opening, excepting for the entrance passageways 184 which permit cables 176 and 182 to enter the housing cavity 190. Unless the frangible tongues 132 or 128 are broken away, no access can be obtained to plug and receptacles 188 and 186 respectively, without leaving behind telltale evidences of unauthorized access.

The apparatus shown in FIG. 12 comprises a housing 192, again having a generally truncated conical shape, but not being provided having an opening at small end 194 thereof. A supporting structure 196, such as a chassis, is shown, having a potentiometer 198 secured thereto, utilizing a nut, shown by dotted lines 200 therefor. Housing 192 is provided having tongues 202, each adapted with protrusions 204 and each having clamping surfaces 206. Interior surface 208, of chassis 196, may engage clamping surfaces 206 so as to permit the installation of housing 192 about openings 208, adapted to receive tongues 202 therein. When so engaged, housing 192 may not be removed unless it is partially or totally destroyed. Shaft end 210, of potentiometer 198, may not be adjusted unless such housing is removed. Thus, a housing of the type illustrated, having only one opening therein, disposed centrally about dotted lines 50, prohibit access to the interior cavity 212 thereof, by unauthorized personnel, when such housing is secured to a supporting surface, plate, or other similar object.

Figure 13:
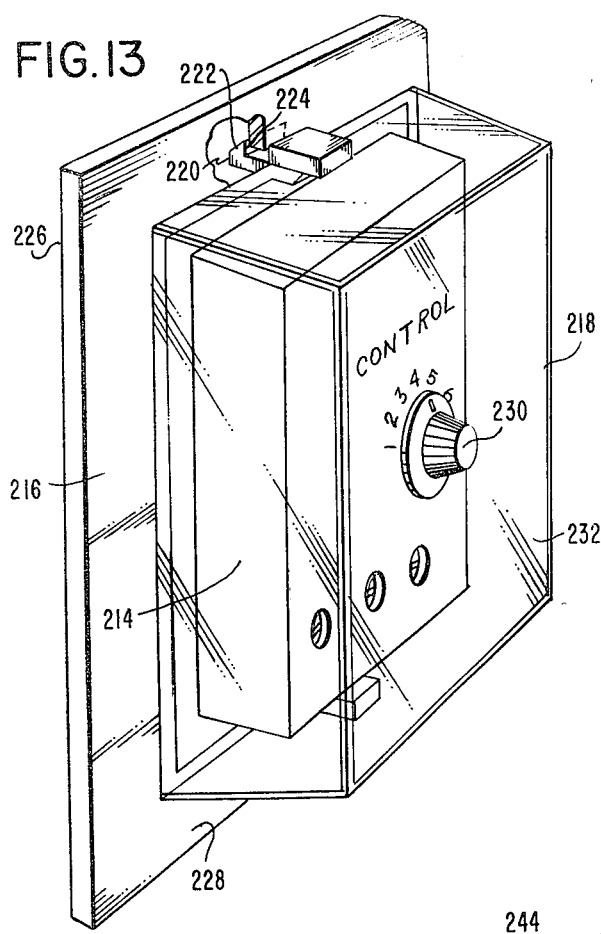
FIG. 13 is a perspective view of a modified form of the embodiment shown in FIG. 1, shown mounted to a supporting surface.

FIG. 13 illustrates a control apparatus 214, mounted to a supporting surface 216. Housing 218, preferably fabricated from a transparent or translucent plastic material, is shown secured to supporting surface 216, employing tongue 220 therefor. Such tongue is provided having a protrusion 222, which is adapted with a flat-like surface 224, forming a clamp-like hook-like end thereto. Flat surface 224 engages a portion of rear surface 226 of plate 216, locking housing 218 to expose surface 228 of plate 216. If desired, knob 230 of control 214 may be disposed behind frontmost surface 232 of housing 214. Alternatively, a small opening, not shown, may be fabricated in surface 232, such that knob 230 may be adjustable without removing housing 218 from locking engagement with plate 216.

Figure 14:
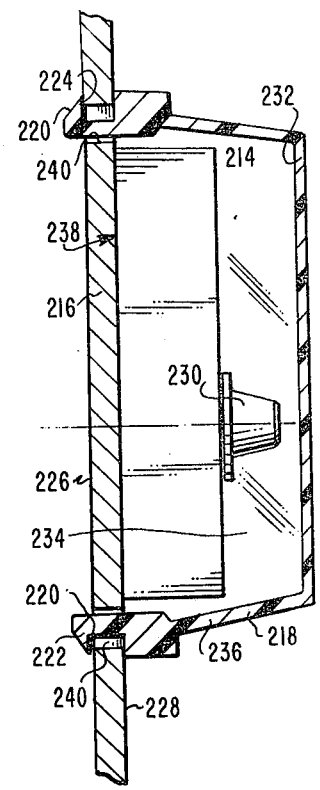
FIG. 14 is a side-elevation, cross-sectional view of the embodiment shown in FIG. 13.

FIG. 14 illustrates housing 218 secured to plate 216 employing a pair of tongues 220 therefor. As shown knob 230 is positioned within cavity 234, formed by side walls 236 and end wall 232 of housing 218. Marginal edges 238, of housing 218 are shown in touching engagement with surface 228, after tongues 220 are locked to plate 216, as by passing through openings 240 formed in plate 216. It can be seen that tongue members 220 extend outwardly from a plane defined by marginal edges 238, from cavity 234 disposed within housing 218.

Figure 15:
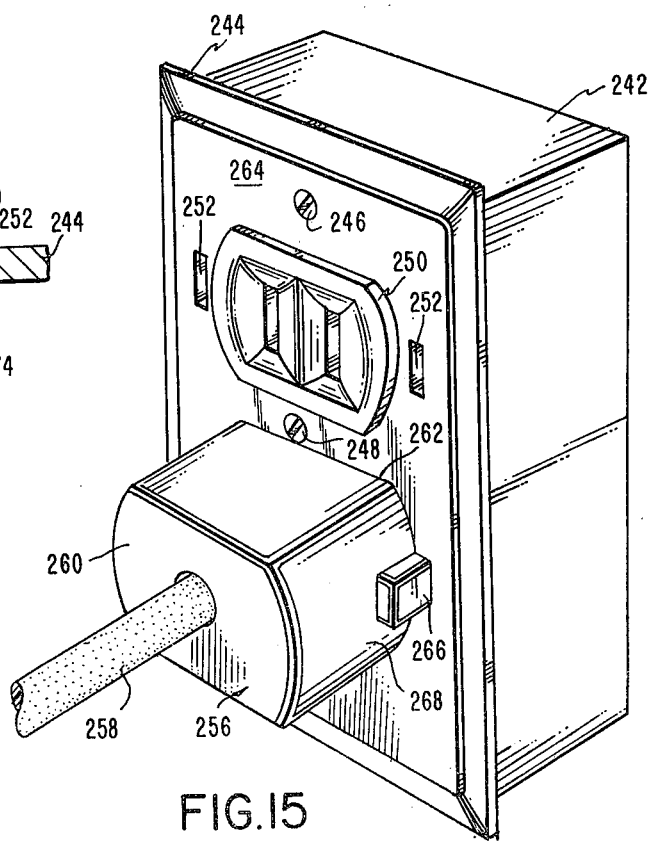
FIG. 15 is a perspective view of the modified version of the apparatus depicted in FIG. 1, shown mounted to a duplex receptacle cover plate.

FIG. 15 illustrates a household utility receptacle box 242, well known in the art. Cover plate 244, similarly well known in the art, is provided having a pair of openings through which screws, similar to screw 246 passes, securing cover plate 244 to utility box 242. Screw 248, as is well known in the art, is utilized to secure a duplex receptacle, having portions 250 thereof passing through openings in plate 244. The present invention contemplates adding two openings 252 adjacent each duplex receptacle outlet portion, for a total of four such holes in each cover plate 244. Housing member 256 is shown having cable 258 emanating outwardly from end 260 thereof. Marginal edges 262 of housing 256 engage outermost surface 264 of cover plate 244. A boss 266 is shown, attached to the exterior wall 268 of housing 256. Another such boss is secured symmetrically to housing 256.

Figure 16:
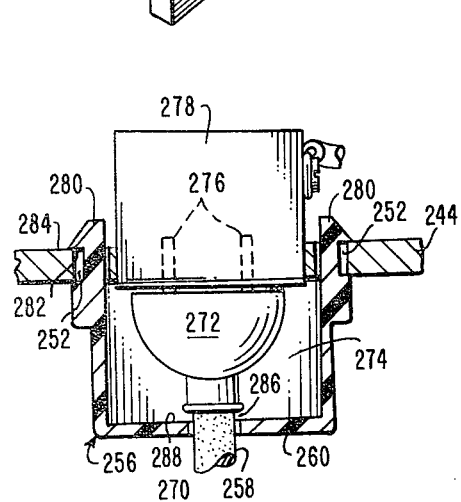
FIG. 16 is a cross-sectional view of a portion of the apparatus illustrated in FIG. 15.

FIG. 16 illustrates housing 256 shown with electrical cable 258 emerging outwardly from an opening 270 located in end wall 260. Plug 272 is electrically connected to cable 258 and is confined within cavity 274 formed within housing 256. Dotted lines 276 depict metallic tongue-like portions of plug 272, utilized for electrical contacting purposes within portion 278 of the duplex receptacle shown in FIG. 15. Tongues 280 being secured to housing 256, are shown passing through openings 252 in plate 244. Clamping surface 282 engages rearmost surface 284 of cover plate 244, prohibiting thereby the removal of housing 256 from the cover plate and thus maintaining plug 272 in electrical communication thereafter with duplex receptacle portion 278. In order to avoid accidental dislodgement of plug 272 from receptacle 278, distance 286, shown separating the proximal end of plug 272 and the interior surface 288 of end wall 260, is kept at a minimum distance.

FIG. 17 illustrates a housing 288, similar to that shown in FIG. 1, but having provided therein a spirally wound metallic element 290. Such spirally wound element has an internal diameter at end 292 thereof, greater than at end 294 thereof. Electrical conductors 296 and 298 are shown entering opening 300. Tongues 302, similar to tongues 42, shown in FIG. 1, are provided extending outwardly from marginal edges 304. End wall 306 is shown devoid of any opening. Wires 296 and 298 are exposed devoid of insulation 308, for portions of the wires that are intended to be inserted within housing 288.

In FIG. 18, housing 288, shown in FIG. 17, has been rotated radially about dotted lines 50, so as to cause electrical conductors 296 and 298 to be twisted about one another, due to the spiral-like screw-type effect obtained by action of metallic insert 290. As shown, exposed conductors 296 and 298 are substantially and entirely confined within cavity 310, formed within housing 288. To insure against further motion of conductors 296 and 298 and their insulated portions 308, tongues 302 may be installed in openings 312 in a supporting plate 314. If desired, another housing 316, shown in dotted lines, may be attached to tongues 302 with or without the presence of plate 314, so as to insure that insulated portions 308 of conductors 296 and 298 are shrouded by housing 316. An opening 318, formed in housing 316, would permit insulated portions 308 of conductors 296 and 298 to pass therethrough. In this fashion, no accidental electrical contact can be made with exposed portions of conductors 296 and 298, and, if desired, housing 288 may be secured at a preferred location by utilizing plate 314, if desired.

FIG. 19 illustrates a utility box cover 320, adapted for attachment to a household utility box, not shown, by use of screws 322. Electrical socket 324 is shown emerging outwardly from surface 326 of boss 328. Four rectangular-like openings 330 are disposed in surface 320, in quadrature, about receptacle 324. As shown, any unauthorized connection, by way of mating plug not shown, may be attached to receptacle 324 at the will of a user.

FIG. 20 illustrates a housing 332 shown provided with a boss 334. Such boss hallmarks the location of a tongue, not shown, similar to tongue 302, shown in FIG. 17. A pair of wing-like elements 336 are shown secured to the exterior surface 338 of housing 332, so as to cover mounting screws 322, depicted in FIG. 19. Thus, when housing 332 is engaged to cover plate 320, free access to receptacle 324, shown in FIG. 19, is not obtained excepting through the use of cable 340. Similarly, an unauthorized user cannot gain access to any electrical cable or terminal secured to receptacle 324, such as by simply removing cover plate 320 from engagement to its utility box. Wings 336 must be destroyed to obtain interior access to receptacle 324, shown in FIG. 19, or to remove or attach any electrical cable, other than cable 340 to electrical receptacle 324 shown in FIG. 19.

FIG. 21 illustrates the attachment of housing 30, as shown in FIG. 1, to cover plate 320. Electrical cable 340a is shown emanating outwardly from hole 52 at end 34 of housing 30. Rectangular holes 320, shown in FIG. 19, are utilized to permit two tongues 42, shown in FIG. 1, to pass through two of such rectangular openings and lockingly engage housing 30 to surface 326. Obviously, removing screws 322 will permit access to the interior of the utility box, not shown, to which cover plate 320 is often secured.

Figure 22:
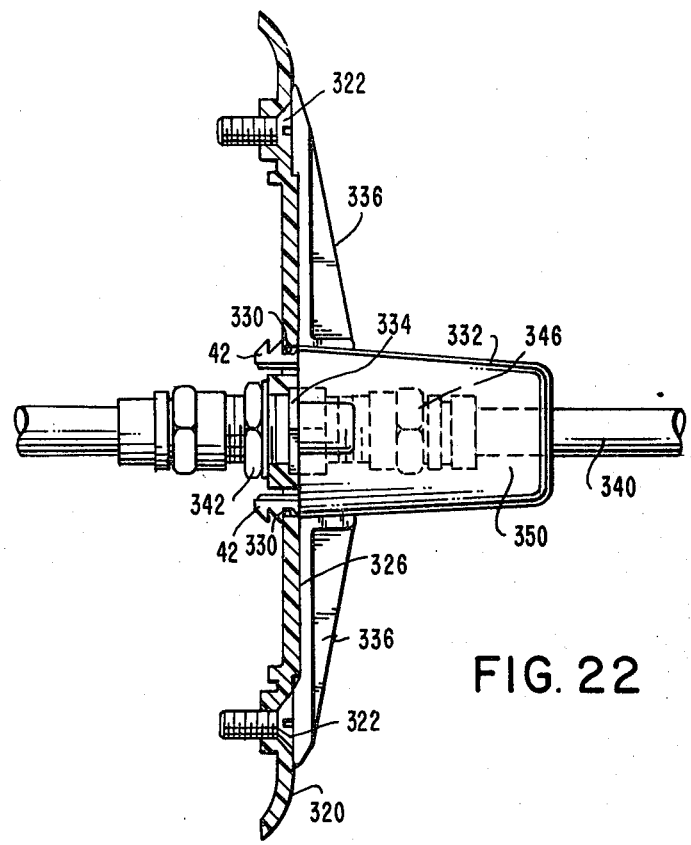
FIG. 22 is a side-elevation cross-sectional view of the apparatus shown in FIG. 20.

FIG. 22 illustrates how housing 332, equipped with wings 336, prevent tampering with screws 322. Socket 342 is shown secured to cover plate 320, utilizing nut 344, shown in dotted lines therefor. Plug 346, similarly shown in dotted lines, is attached electrically to the left-hand end of cable 340. The exposed portions of sockets 344 and the entirety of plug 346 are totally confined within cavity 350, formed by housing 332 and closed by lateral surface 326 of cover plate 320. Tongues 42 are shown passing through openings 330 formed in cover plate 320.

FIG. 23 illustrates housing 30 having its marginal edges 38 engaging exterior surface 326 of cover plate 320. The cover plate is shown secured to household utility box 352, shown in cross section, utilizing screws 322 therefor. Another housing 31 may be employed within cavity 354, formed within household utility box 352, so as to totally shroud the entire portions of receptacle 342a, contained within cavity 356 thereof. The tongue portions of housing 30 and 31 alternately engage openings 330, as shown in FIG. 19, in cover plate 320, so as to lockingly engage housings 30 and 31 to one another. Knot 358, in cable 360, electrically connected to receptacle 342a, is employed so as to eliminate the need, if desired, to remove cover plate 320 from its mounted position when replacing a cracked or otherwise tampered with housing 30. In this fashion, with or without knot 358, a user may not tamper with either plug or receptacle unless leaving behind telltale signs, even though cover plate 320 has been disengaged from utility box 352. Knot 358 may not be utilized, if openings 330 are configured in a fashion to permit the tongue portions of housing 30 to engage and lock onto cover plate 320. If such be the case, housing 30 may be attached and successfully locked to cover plate 320 without need for the presence of housing 31. Alternatively, if a single housing 31 is to be employed, it may be installed secured to cover plate 320 without utilizing knot 358. Superalternatively, both housings 30 and 31 may be secured engaged to cover plate 320 and to one another, without utilizing knot 358.

The above disclosure is offered for public dissemination in return for the grant of a patent. Although it is detailed to insure adequacy and aid understanding, this is not intended to prejudice that purpose of a patent which is to cover each new inventive concept therein, no matter how others may later disguise it by variations in form or additions or further implements; and although the disclosure principally makes reference to a pipe, cable, or conduit, being used with fittings for pneumatic, hydraulic or electrical purposes, it would be understood that the terms are used for convenience and that the word "fitting" may encompass any form of device which has peripheral dimensions different from that of the pipe, cable, or conduit to which such "fitting" is connected. It will also be understood that the terms including the words "cable, pipe, or conduit" include single conductors as well as multiple conductor arrangements, single pipes as well as multiple pipe arrangements, hoses, of either the single or multiple passageway variety, conduits of either the single or multiple passageway variety. Finally, while the illustrated embodiments utilize one or more tongues extending outwardly from the marginal edge defining the major opening of a housing, it can be readily seen that such tongues may emanate from the interior portions or cavity of the housing rather than be secured at their base portions, to the marginal edges above described. It will be appreciated that the number and location of the tongues and their clamping surfaces as well as the number and location of the seating or locking surfaces are a matter of design choice and will produce well-working designs.

We claim:

1. A frangible housing, said housing defining side walls, said side walls being intermediate one end and another end of said housing, said one and said other end of said housing each carrying openings, said openings residing in a pair of planes extending parallel to one another, at least one tongue-like element, said at least one tongue-like element having one end thereof secured to said housing, the other end of said at least one tongue-like element carrying at least one clamping-like surface thereon, means to non-releasably lockingly clampingly engage said at least one clamping surface to a seating surface carried on another structure, whereby said housing is attachably securable to said other structure when said at least one clamping surface is in touching seating engagement with said seating surface, said at least one tongue having a longitudinal axis, said longitudinal axis extending normal to one of said planes, wherein adjacent portions of said side walls are joined together by a hinge, and wherein other portions of said side walls are separable from one another along a parting line disposed intermediate said one end and said other end of said housing, whereby at least one of said portions of said housing carries one of the said at least one tongue, said longitudinal axis extending parallel to the axis of said parting line, a side acting tongue, said side acting tongue being secured to one of said at least one of said portions of said side walls and extending substantially tangentially to said longitudinal axis, at least one side acting seating surface being configured in another of said at least one of said portions of said side walls, means to clampingly non-releasably lockingly engage a clamping surface of said at least one side acting tongue to said at least one side acting seating surface of said another portion of said side walls, whereby said housing defines a cavity disposed intermediate its side walls and said one end and said another end of said housing.

2. The apparatus as claimed in claim 1 wherein said housing comprises a unitary construction.

3. The apparatus as claimed in claim 1 whereby said opening and said another opening disposed in said ends of said housing are of equal size.

4. The apparatus as claimed in claim 1 further comprising said one end and said other end of said housing having at least a pair of grooves in said one end and said other end thereof, said at least a pair of grooves in said one end and said other end of said housing defining an opening when said portions of said housing are disposed in locking clamping engagement with one another.

5. The apparatus as claimed in claim 1 wherein said clamping surface of said at least one side acting tongue extends radially outwardly from a cavity defined by said side walls of said housing when said adjacent portions of said housing are in touching engagement along said parting line.

6. The apparatus as claimed in claim 1 wherein said at least one clamping surface is disposed extending intermediate said at least one tongue and an opposed portion of said side walls of said housing.

7. The apparatus as claimed in claim 1 wherein said at least one seating surface is disposed within a hollowed-out boss-like portion of said housing, said boss-like portion of said housing being carried on said other end of said housing and communicating with said opening.

8. An apparatus as claimed in claim 1 wherein said another structure is another housing, said another housing being identical to said housing, said one ends of each housing being disposed in touching engagement with one another when said clamping surface of said housing is engaged with said seating surface of said another housing.

9. The apparatus as claimed in claim 1 wherein said housing carries at least one seating surface, said seating surface being carried by another of said at least one portions of said housing, still another housing, said still another housing carrying at least one seating surface thereon, means to engage said at least one clamping surface of said housing with one of said at least one seating surfaces of said another housing.

10. The apparatus as claimed in claim 9 wherein said at least one seating surface is disposed intermediate said one end and said other end of said another housing.

* * * * *

UNITED STATES PATENT AND TRADEMARK OFFICE
CERTIFICATE OF CORRECTION

PATENT NO. : 4,438,995
DATED : Mar. 27, 1984
INVENTOR(S) : FISHER et al

It is certified that error appears in the above—identified patent and that said Letters Patent is hereby corrected as shown below:

IN THE ABSTRACT: Line 3, delete "fittig" and insert --fitting--.

Column 7, line 49, delete "fored" and insert --forced--.

Signed and Sealed this

Twenty-eighth Day of August 1984

[SEAL]

Attest:

GERALD J. MOSSINGHOFF

Attesting Officer  Commissioner of Patents and Trademarks